(12) United States Patent
Goto

(10) Patent No.: US 12,153,468 B2
(45) Date of Patent: Nov. 26, 2024

(54) DISPLAY APPARATUS

(71) Applicant: Tomoyuki Goto, Tokyo (JP)

(72) Inventor: Tomoyuki Goto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 167 days.

(21) Appl. No.: 18/056,268

(22) Filed: Nov. 17, 2022

(65) Prior Publication Data

US 2023/0205269 A1    Jun. 29, 2023

(30) Foreign Application Priority Data

Dec. 23, 2021 (JP) ................................ 2021-209521

(51) Int. Cl.
| | | |
|---|---|---|
| *G06F 1/16* | (2006.01) | |
| *G06F 3/041* | (2006.01) | |
| *G06F 3/042* | (2006.01) | |
| *G06F 3/044* | (2006.01) | |

(52) U.S. Cl.
CPC .......... *G06F 1/1643* (2013.01); *G06F 1/1618* (2013.01); *G06F 3/0414* (2013.01); *G06F 3/0421* (2013.01); *G06F 3/044* (2013.01)

(58) Field of Classification Search
CPC ...... G06F 1/1654; G06F 1/1643; G06F 1/162; G06F 1/1618; G06F 3/044; G06F 3/0441; G06F 3/0442; G06F 3/0444; G06F 3/0445; G06F 3/046
See application file for complete search history.

(56) References Cited

U.S. PATENT DOCUMENTS

| | | | |
|---|---|---|---|
| 11,886,651 B2* | 1/2024 | Hotelling | ............. G06F 3/0445 |
| 2009/0058365 A1 | 3/2009 | Goto | |
| 2009/0067471 A1 | 3/2009 | Goto et al. | |
| 2009/0197156 A1 | 8/2009 | Goto | |
| 2009/0212749 A1 | 8/2009 | Goto | |
| 2013/0154564 A1 | 6/2013 | Goto | |
| 2013/0229363 A1* | 9/2013 | Whitman | ............. G06F 3/0219 |
| | | | 345/173 |
| 2014/0101535 A1* | 4/2014 | Kim | ............. G06F 3/04886 |
| | | | 715/761 |
| 2014/0362168 A1 | 12/2014 | Goto | |
| 2015/0338888 A1* | 11/2015 | Kim | ............. G06F 1/1677 |
| | | | 345/156 |
| 2016/0098131 A1* | 4/2016 | Ogata | ............. G06F 3/044 |
| | | | 345/173 |
| 2016/0132074 A1* | 5/2016 | Kim | ............. G06F 1/1652 |
| | | | 345/173 |
| 2016/0267923 A1 | 9/2016 | Goto | |
| 2017/0013225 A1 | 1/2017 | Takahashi et al. | |
| 2017/0019635 A1 | 1/2017 | Kuwata et al. | |
| 2017/0019636 A1 | 1/2017 | Kitazawa et al. | |

(Continued)

FOREIGN PATENT DOCUMENTS

| | | |
|---|---|---|
| JP | 2018-156304 | 10/2018 |
| WO | WO2015/190753 A1 | 12/2015 |

*Primary Examiner* — Anthony Q Edwards
(74) *Attorney, Agent, or Firm* — XSENSUS LLP

(57) ABSTRACT

A display apparatus includes a first casing including a first screen including a first touch sensor to receive a finger input and a second casing including a second screen including a second touch sensor to receive a pen input. As the first casing and the second casing are overlapped with each other, the first screen and the second screen overlap with each other.

10 Claims, 6 Drawing Sheets

(56) References Cited

U.S. PATENT DOCUMENTS

| | | | |
|---|---|---|---|
| 2017/0032555 A1 | 2/2017 | Gingawa et al. | |
| 2017/0034474 A1 | 2/2017 | Goto et al. | |
| 2017/0034480 A1 | 2/2017 | Goto et al. | |
| 2017/0034481 A1 | 2/2017 | Igarashi et al. | |
| 2017/0041570 A1 | 2/2017 | Takahashi et al. | |
| 2017/0078616 A1 | 3/2017 | Uchiyama et al. | |
| 2017/0127017 A1 | 5/2017 | Takahashi et al. | |
| 2017/0127020 A1 | 5/2017 | Takahashi et al. | |
| 2020/0026327 A1* | 1/2020 | Hendren | G06F 1/1652 |
| 2021/0132793 A1* | 5/2021 | Burns | G06F 3/04886 |
| 2021/0311539 A1 | 10/2021 | Goto | |
| 2021/0311693 A1 | 10/2021 | Goto | |
| 2023/0039953 A1* | 2/2023 | Seger, Jr. | G06F 1/1652 |
| 2024/0004532 A1* | 1/2024 | Soli | G06F 3/04842 |

\* cited by examiner

DISPLAY APPARATUS

CROSS-REFERENCE TO RELATED APPLICATIONS

This patent application is based on and claims priority pursuant to 35 U.S.C. § 119(a) to Japanese Patent Application No. 2021-209521, filed on Dec. 23, 2021, in the Japan Patent Office, the entire disclosure of which is hereby incorporated by reference herein.

BACKGROUND

Technical Field

The present disclosure relates to a display apparatus.

Related Art

Some products, such as laptop personal computers and smartphones, include two screens and can be folded. For such products, a user interface such as a touch input or a pen input is often used as an input method instead of an external input device such as a keyboard or a mouse.

There is known a product having a configuration in which a hybrid touch sensor system including two types of detecting methods such as an electromagnetic induction method and a capacitance method is employed, and a touch input according to the capacitance method and a pen input according to the electromagnetic induction method are simultaneously detected on the same screen.

SUMMARY

In one aspect, a display apparatus includes a first casing including a first screen including a first touch sensor to receive a finger input and a second casing including a second screen including a second touch sensor to receive a pen input. As the first casing and the second casing are overlapped with each other, the first screen and the second screen overlap with each other.

In another aspect, a display apparatus includes a first casing including a first screen including no touch sensor and a second casing including a second screen including an infrared touch sensor of an infrared scanning method. As the first casing is overlapped on the second casing, the first screen is overlapped on the second screen. The infrared touch sensor has a hovering amount larger than a thickness of the first casing in an overlapping direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
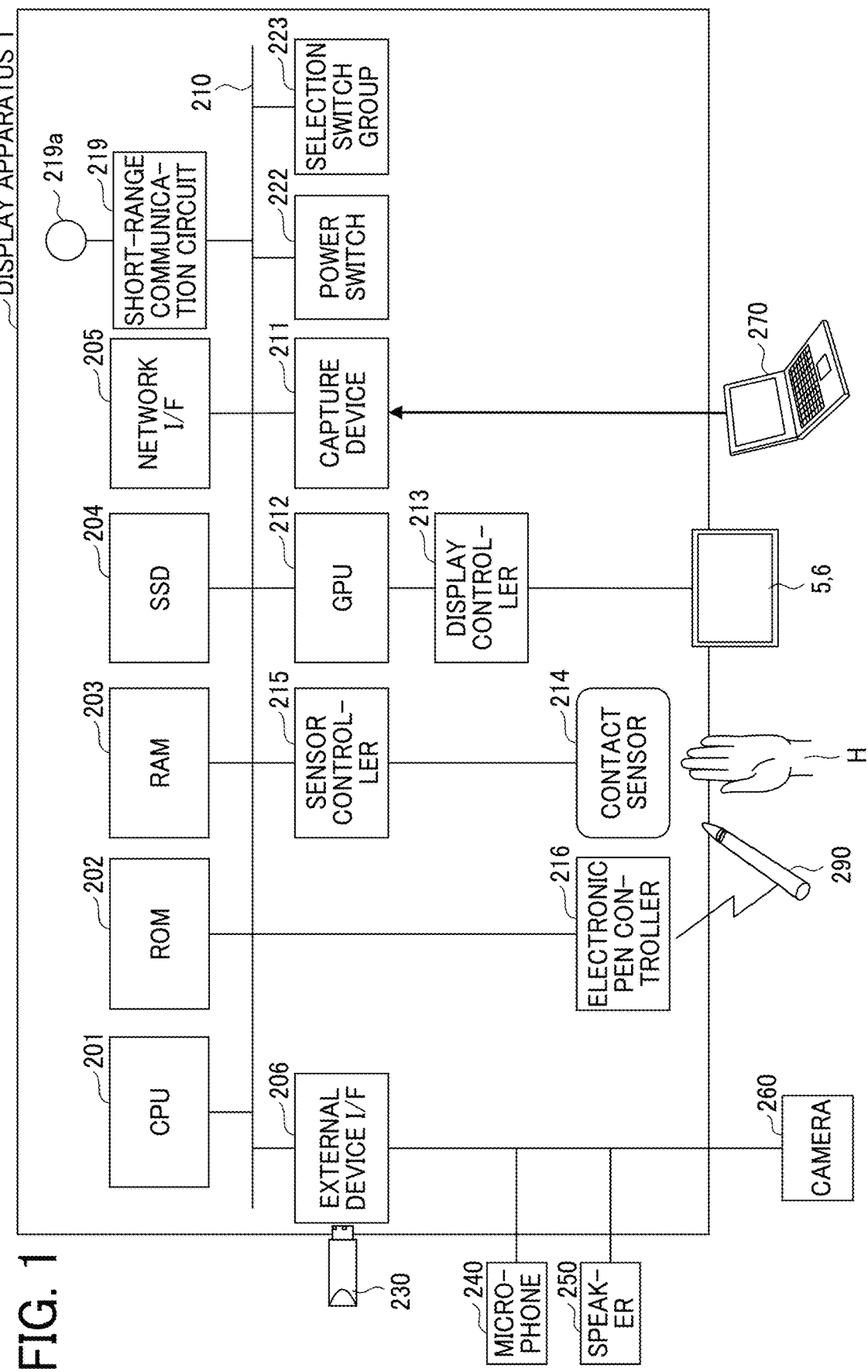
FIG. 1 is a block diagram illustrating an example of a hardware configuration of a display apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given in detail of an information processing apparatus, an image forming system, an information processing method, and a non-transitory recording medium according to one embodiment of the present disclosure with reference to the drawings. The present disclosure, however, is not limited to the following one or more embodiments, and the constituent elements of the following one or more embodiments include elements that may be easily conceived by those skilled in the art, those being substantially the same ones, and those being within equivalent ranges. Furthermore, various omissions, substitutions, changes, and combinations of the constituent elements may be made without departing from the gist of the following one or more embodiments.

Hereinafter, embodiments of the present disclosure are described with reference to the drawings. In order to facilitate understanding of the description, the same components are denoted by the same reference numerals in the respective drawings as much as possible, and redundant description is omitted.

First Embodiment

A first embodiment of the present disclosure is described with reference to FIGS. 1 to 5. A display apparatus 1 according to the present embodiment is a display apparatus with a touch sensor and includes two displays, namely, a display 5 and a display 6.

FIG. 1 is a block diagram illustrating an example of a hardware configuration of the display apparatus 1 according to embodiments of the present disclosure. As illustrated in FIG. 1, the display apparatus 1 includes a central processing unit (CPU) 201, a read only memory (ROM) 202, a random access memory (RAM) 203, a solid state drive (SSD) 204, a network interface (I/F) 205, and an external device I/F 206.

The CPU 201 controls entire operation of the display apparatus 1. The ROM 202 stores a program such as an initial program loader (IPL) used for driving the CPU 201. The RAM 203 is used as a work area for the CPU 201. The SSD 204 stores various data such as a program for a display apparatus. The network I/F 205 controls communication with an external device through a communication network. The external device I/F 206 is an interface for connection with various external devices. Examples of the external device include, but are not limited to, a universal serial bus (USB) memory 230 and external devices such as a microphone 240, a speaker 250, and a camera 260.

The display apparatus 1 also includes a capture device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and a selection switch group 223.

The capture device 211 causes a display of an external personal computer (PC) 270 to display a still image or a video image based on image data. In addition, the capture device 211 (an electronic device) captures an input of a video signal from a connected device via a video terminal and displays an image on a display (display unit) such as the display 5 or 6 included in the display apparatus 1 based on the captured video signal. Examples of the video terminal include digital terminals such as a High-Definition Multimedia Interface (HDMI), a display port (DP), and a digital visual interface (DVI), and analog terminals such as an analog red green blue (RGB) connector and a composite video terminal. Examples of the connected device serving as a source device of a video signal include video reproducing devices such as a digital versatile disc (DVD) recorder and a digital camera in addition to the external PC 270 illustrated in FIG. 1.

The GPU 212 is a semiconductor chip dedicated to processing of a graphical image. The display controller 213 controls screen display to output an image processed by the GPU 212 to the displays 5 and 6. The contact sensor 214 detects a touch onto the displays 5 and 6 with the electronic pen 290 or a user's hand H. The sensor controller 215 controls processing of the contact sensor 214. The contact sensor 214 inputs and detects coordinates by using an infrared blocking system. More specifically, for inputting and detecting the coordinates, the display 5 is provided with two light receiving and emitting devices disposed on both upper side ends of the display 5, and a reflector frame surrounding the sides of the display 5. The light receiving and emitting devices emit a plurality of infrared rays in parallel to a surface of the display 5. Light-receiving elements receive lights passing in the direction that is the same as an optical path of the emitted infrared rays, which are reflected by the reflector frame. The same method is also used for the display 6 for inputting and detecting the coordinates. The contact sensor 214 outputs, to the sensor controller 215, an identifier (ID) of an infrared ray that is blocked by an object after being emitted from the two light receiving and emitting devices. Based on the ID of the infrared ray, the sensor controller 215 detects specific coordinates that are touched by the object. The electronic pen controller 216 communicates with the electronic pen 290 to detect a touch by the tip or bottom of the electronic pen to the displays 5 and 6. The short-range communication circuit 219 is a communication circuit in compliance with the near field communication (NFC), the BLUETOOTH (Registered Trademark), and the like. The power switch 222 turns on or off the power of the display apparatus 1. The selection switch group 223 is a group of switches for adjusting brightness, hue, etc., of display on the displays 5 and 6, for example.

Further, the display apparatus 1 includes a bus line 210. The bus line 210 is an address bus, a data bus, or the like that electrically connects each component illustrated in FIG. 1 such as the CPU 201.

The system of the contact sensor 214 is not limited to the infrared blocking system. The contact sensor 214 may include, as a detector, a capacitive touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to the display. In addition to or alternative to detecting a touch by the tip or bottom of the electronic pen 290, the electronic pen controller 216 may also detect a touch by another part of the electronic pen 290, such as a part held by a hand of a user.

In one or more embodiments of the present disclosure, the display apparatus 1 according to the present embodiment may not include the microphone 240, the speaker 250, the camera 260, the human sensor 224, and the capture device 211. In a case where the display apparatus 1 according to the present embodiment is implemented as a display apparatus that does not include a controller, the display apparatus 1 does not necessarily include the control unit 21. In this case, the sensor controller 215 is connected to the external PC 270 or the like, and the display apparatus 1 is controlled by the external PC 270.

Figure 2:
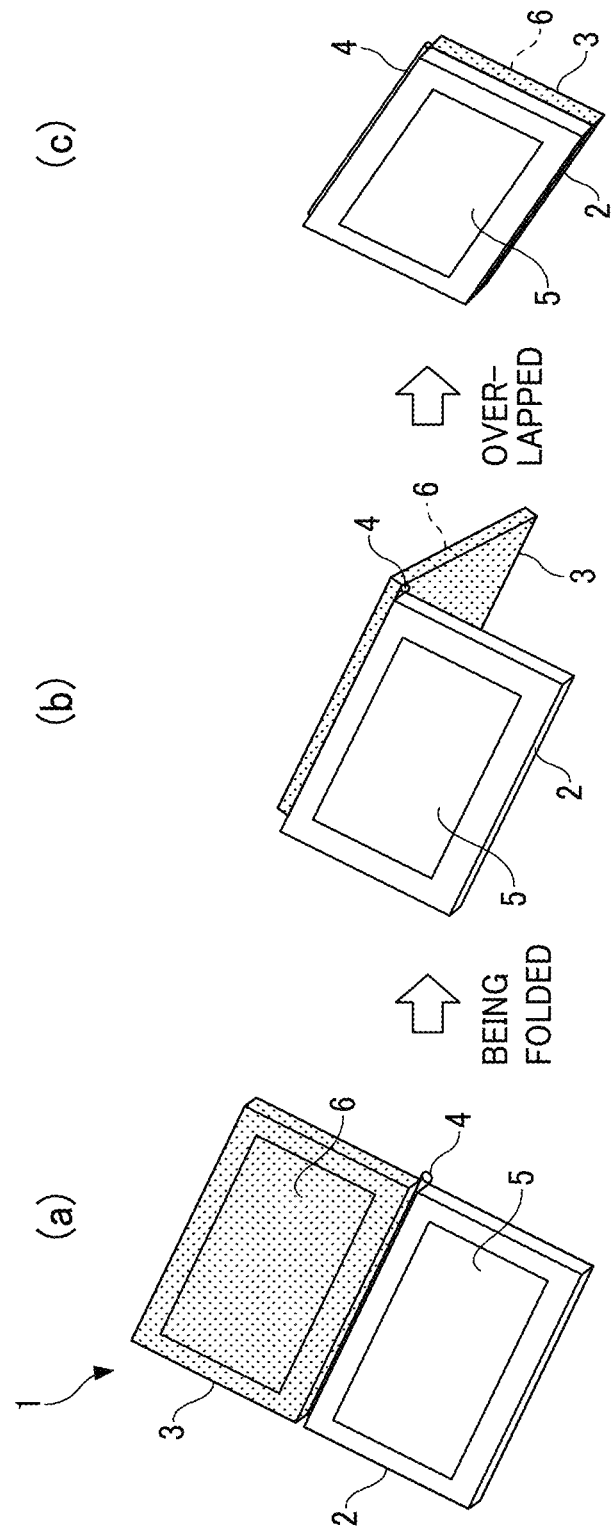
FIG. 2 is a diagram illustrating an example of a schematic configuration of the display apparatus according to a first embodiment of the present disclosure.

FIG. 2 is a diagram illustrating an example of a schematic configuration of the display apparatus 1 according to the first embodiment. Part (a) of FIG. 2 is a diagram illustrating the display apparatus 1 in an unfolded state. Part (b) of FIG. 2 is a diagram illustrating the display apparatus 1 in the process of being folded or unfolded. Part (c) of FIG. 2 is a diagram illustrating the display apparatus 1 in an overlapped state.

As illustrated in FIG. 2, the display apparatus 1 according to the first embodiment is a display apparatus with a touch sensor and includes the two displays 5 and 6.

The display apparatus 1 includes a casing 2 (first casing), a casing 3 (second casing), and a connecting portion 4. Both of the casing 2 and the casing 3 are members that are rectangular and planar, and have principal surfaces of substantially the same shape and size.

The connecting portion 4 is fixed to one side of each of the rectangular casings 2 and 3. The connecting portion 4 is a rotatable member such as a hinge, and is disposed so that the one side of each of the rectangular casings 2 and 3 is rotatable around a rotating shaft of the hinge. Accordingly, as illustrated in parts (b) and (c) of FIG. 2, the connecting portion 4 connects the casings 2 and 3 in a foldable manner.

As used herein, the term "connected/coupled" includes both direct connections and connections in which there are one or more intermediate connecting elements.

As illustrated in part (a) of FIG. 2, the display 5 (first screen) and the display 6 (second screen) are mounted on the principal surfaces of the casings 2 and 3 respectively in the same direction when the casings 2 and 3 are unfolded in parallel on each side of the connecting portion 4 with the connecting portion 4 as the center. In other words, in the unfolded state, the two displays 5 and 6 are arranged in parallel.

The display 5 mounted on the casing 2 includes a touch sensor to receive a finger input. On the other hand, the display 6 mounted on the casing 3 includes a touch sensor to receive a pen input.

According to the first embodiment, the touch sensor to receive the finger input included in the display 5 is a capacitive touch sensor. The touch sensor to receive the pen input included in the display 6 is an inductive touch sensor employing electromagnetic induction.

As illustrated in part (c) of FIG. 2, the display apparatus 1 includes the display 5 and the display 6 to be overlapped with each other when the casing 2 and the casing 3 are overlapped with each other. When the casings 2 and 3 are folded with the connecting portion 4 as the center as illustrated in part (b) of FIG. 2, the casings 2 and 3 are overlapped with each other and the displays 5 and 6 are overlapped with each other as illustrated in part (c) of FIG. 2.

Figure 3:
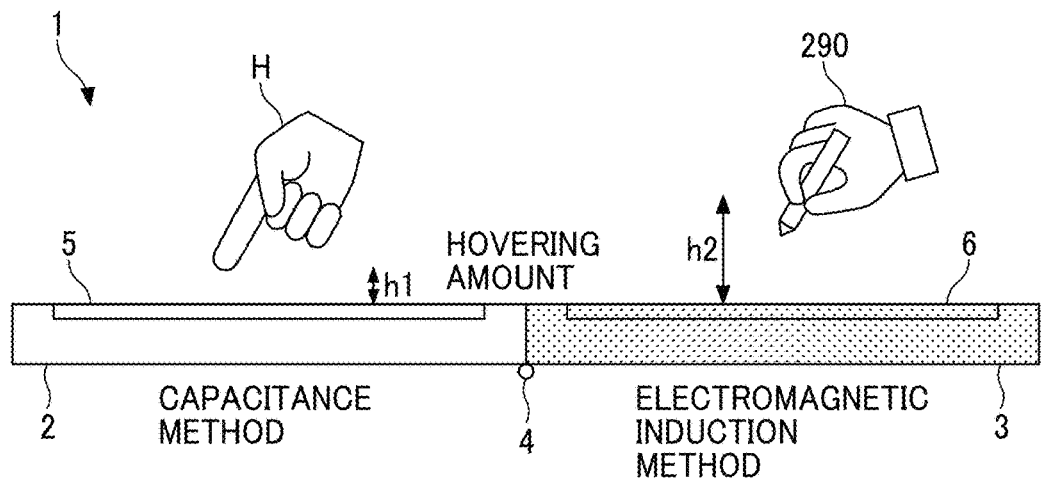
FIG. 3 is a schematic diagram illustrating a hovering amount of the display apparatus according to the first embodiment of the present disclosure.
Figure 4:
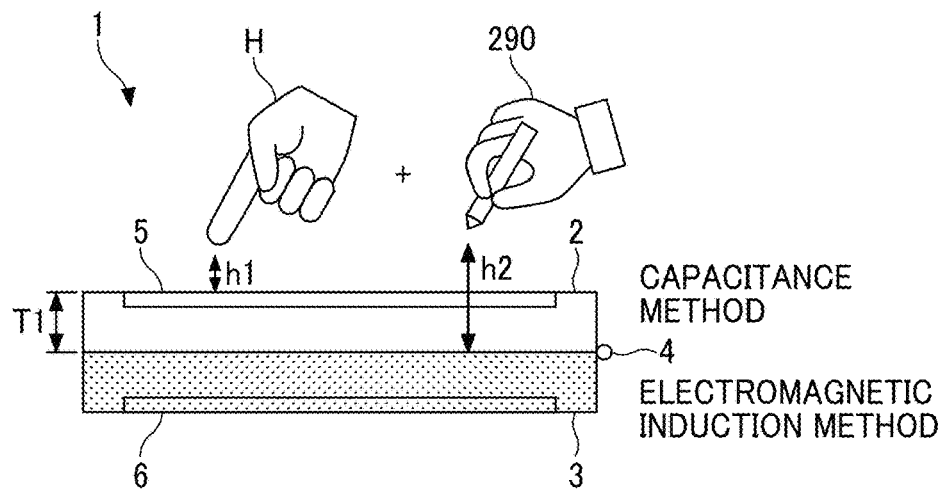
FIG. 4 is a schematic diagram illustrating the hovering amount of the display apparatus in an overlapped state according to the first embodiment of the present disclosure.

FIG. 3 is a schematic diagram illustrating a hovering amount of the display apparatus 1 according to the first embodiment. FIG. 4 is a schematic diagram illustrating the hovering amount of the display apparatus 1 in an overlapped state according to the first embodiment.

Here, the "hovering amount" refers to the maximum distance at which a touch can be detected even when the touch is contactless with a surface of a screen of a touch panel as illustrated in FIGS. 3 and 4. The hovering amount varies depending on a method of a touch sensor.

A hovering amount h1 of the capacitive touch sensor included in the display 5 is about several millimeters. On the other hand, a hovering amount h2 of the inductive touch sensor included in the display 6 is about several tens of millimeters. In other words, the hovering amount h2 of the touch sensor to receive the pen input included in the display 6 is larger than the hovering amount h1 of the touch sensor to receive the finger input included in the display 5 in the display apparatus 1 according to the first embodiment.

Particularly in the present embodiment, as illustrated in FIG. 4, it is preferable that the hovering amount h2 of the inductive touch sensor of the casing 3 is set larger than a thickness T1 of the casing 2 in an overlapping direction. This configuration is advantageous when the display apparatus 1 is used with the casings 2 and 3 in the overlapped state and with the display 6 including the inductive touch sensor of the casing 3 positioned on a bottom side of the display apparatus 1 as illustrated in FIG. 4. The hovering amount h2 that is the maximum distance at which a touch can be detected is large enough that a pen input can go through the display 5 including the capacitive touch sensor of the casing 2 positioned at an upper side of the display apparatus 1 and be detected. A finger input to the display 5 is also detected. Accordingly, the user can use both touch sensors to receive the finger input and the pen input by using only the display 5 positioned at the upper side of the display apparatus 1.

As described above, according to the first embodiment, even when each of the two displays 5 and 6 includes a single touch sensor of a different method, both the pen input and the finger input can be detected by the displays 5 and 6 being overlapped with each other, and the pen input and the finger input can be simultaneously detected with high accuracy. In addition, even when both the finger input and the pen input are used in combination, the display apparatus 1 does not need to include two touch sensors of different methods on one display, resulting in a cost reduction of touch sensor.

As illustrated in FIG. 3, the two displays 5 and 6 of the display apparatus 1 are oriented in the same direction when the casings 2 and 3 are unfolded with the connecting portion 4 as the center. As illustrated in FIG. 4, the two displays 5 and 6 are oriented in directions opposite to each other when the casings 2 and 3 are folded with the connecting portion 4 as the center. For this reason, in a state where the casings 2 and 3 are folded and the two displays 5 and 6 are overlapped with each other, a detection direction of the inductive touch sensor included in the display 6 of the casing 3 positioned at the bottom side is reversed as illustrated in FIG. 4. In such a case, the display apparatus 1 preferably performs control to switch the detection direction of the inductive touch sensor in a reverse direction. A description is now given of an example of the control of the detection direction performed by the display apparatus 1 with reference to FIG. 5.

Figure 5:
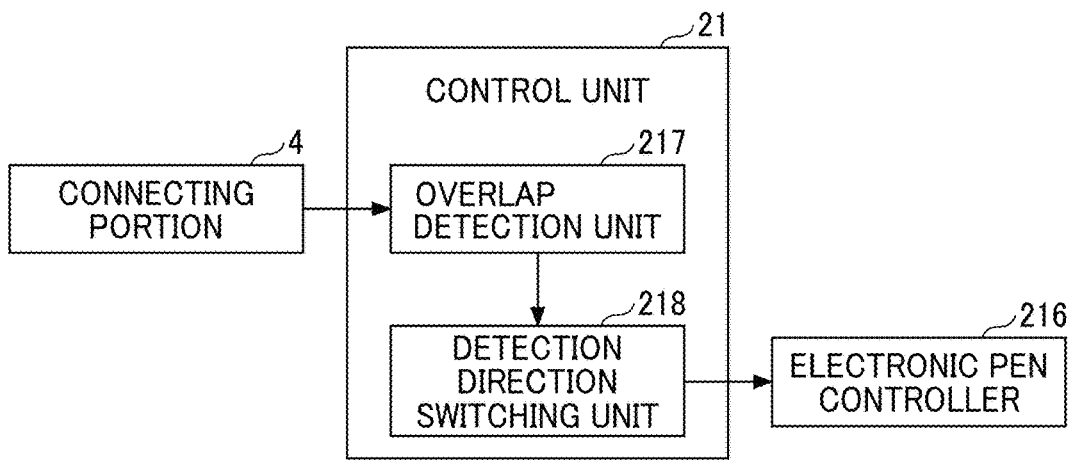
FIG. 5 is a block diagram illustrating switching of detection direction of an inductive touch sensor according to the first embodiment of the present disclosure.

FIG. 5 is a block diagram illustrating switching of the detection direction of the inductive touch sensor according to the first embodiment. The control unit 21 illustrated in FIG. 5 corresponds to, for example, a control unit that includes the CPU 201 and the like illustrated in FIG. 1. The control unit 21 includes an overlap detection unit 217 and a detection direction switching unit 218 as functional units relating to switching of the detection direction of the inductive touch sensor.

The overlap detection unit 217 detects that the connecting portion 4 is being rotated to the overlapped state, and thereby detects a state in which the two displays 5 and 6 are overlapped with each other. An example of a method of detecting that the connecting portion 4 is being rotated to the overlapped state is, for example, measuring a rotation angle of the connecting portion 4. Alternatively, a contact detection part such as a contact sensor or a switch may be provided on either of the principal surfaces on the back sides, on which the display 5 or 6 is not mounted, among the principal surfaces of the casings 2 and 3. That is, the contact detection part is provided on either of the principal surfaces that face to each other and come into contact with each other in the overlapped state. When the contact detection part detects that the principal surfaces on the back sides of the casings 2 and 3 are in contact with each other, the display apparatus 1 may be determined to be in the overlapped state illustrated in FIG. 4.

The detection direction switching unit 218 switches the detection direction of the inductive touch sensor in a reverse direction when the overlap detection unit 217 detects that the displays 5 and 6 are in the overlapped state. The detection direction switching unit 218 transmits, for example, a command to switch the detection direction of the inductive touch sensor to the electronic pen controller 216 illustrated in FIG. 1. The electronic pen controller 216 switches the detection direction of the inductive touch sensor in response to receiving the command.

Accordingly, the control unit 21 sets the detection direction of the touch sensor to receive the pen input to a display direction of the display 6 when the casings 2 and 3 are in the unfolded state, and switches the detection direction of the touch sensor to receive the pen input to the display direction of the display 5 when the casings 2 and 3 are in the overlapped state.

According to the first embodiment, such switching control enables reliable use of both touch sensors to receive the finger input and the pen input by using only the display 5 on the upper surface in a state in which the casings 2 and 3 are folded and the two displays 5 and 6 are overlapped with each other.

Second Embodiment

Figure 6:
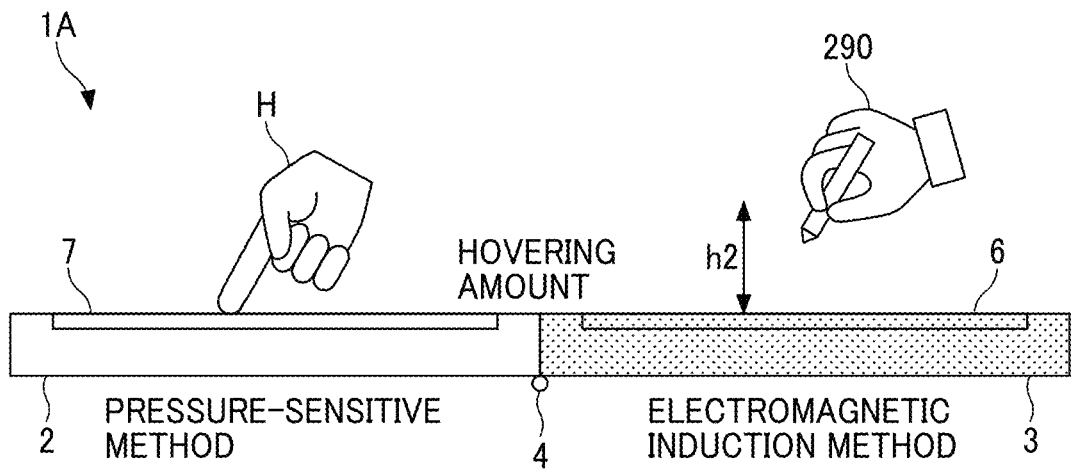
FIG. 6 is a schematic diagram illustrating the hovering amount of the display apparatus according to a second embodiment of the present disclosure.
Figure 7:
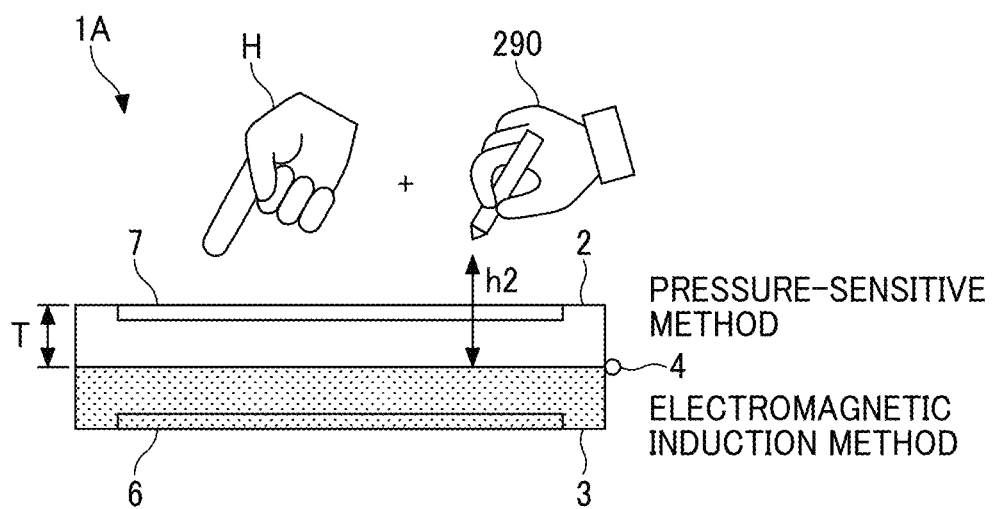
FIG. 7 is a schematic diagram illustrating the hovering amount of the display apparatus in the overlapped state according to a second embodiment of the present disclosure.

A second embodiment of the present disclosure is described with reference to FIGS. 6 and 7. FIG. 6 is a schematic diagram illustrating a hovering amount of a display apparatus 1A according to the second embodiment. FIG. 7 is a schematic diagram illustrating the hovering amount of the display apparatus 1A in the overlapped state according to the second embodiment.

As illustrated in FIGS. 6 and 7, a display 7 (first screen) is mounted on the casing 2 included in the display apparatus 1A according to the second embodiment. A touch sensor to receive a finger input included in the display 7 is a pressure-sensitive touch sensor. The pressure-sensitive touch sensor detects physical contact with pressure. Therefore, the pressure-sensitive touch sensor does not cause a phenomenon called hovering which touch sensors of other methods cause. The hovering is a phenomenon in which a touch is detected even when the touch is contactless with a surface of a screen of a touch panel. Accordingly, the hovering amount of the pressure-sensitive touch sensor is 0 millimeter.

Similar to the first embodiment, assuming that the display apparatus 1A of the second embodiment is used with the casings 2 and 3 in the overlapped state and with the display 6 including the inductive touch sensor of the casing 3 positioned on a bottom side of the display apparatus 1A as illustrated in FIG. 7, the hovering amount h2 that is the maximum distance at which a touch can be detected is larger than a thickness T of the casing 2 that a pen input can go through the display 7 including the pressure-sensitive touch sensor of the casing 2 positioned at an upper side of the display apparatus 1A and be detected. A finger input to the display 7 is also detected. Accordingly, the user can use both touch sensors to receive the finger input and the pen input by using only the display 7 positioned at the upper side of the display apparatus 1A. As a result, the display apparatus 1A of the second embodiment provides the same effects described in the first embodiment.

Third Embodiment

Figure 8:
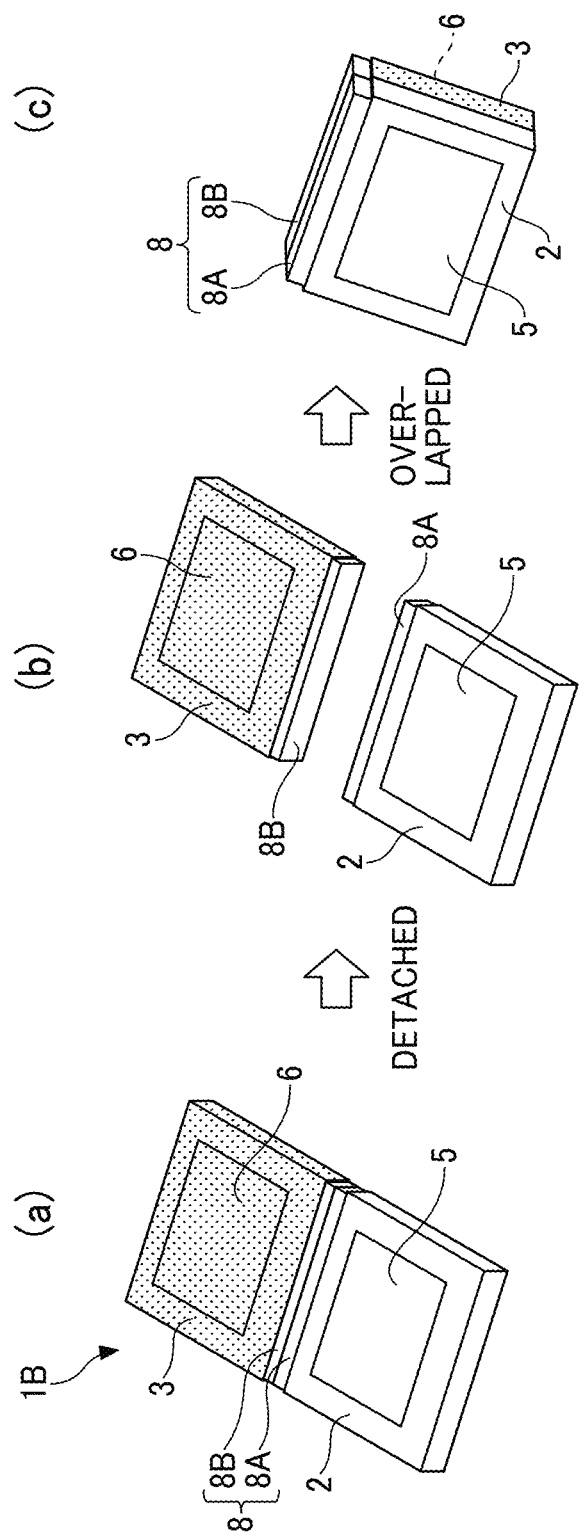
FIG. 8 is a diagram illustrating an example of a schematic configuration of the display apparatus according to a third embodiment of the present disclosure.

A third embodiment of the present disclosure is described with reference to FIG. 8. FIG. 8 is a diagram illustrating an example of a schematic configuration of a display apparatus 1B according to the third embodiment. Similar to parts (a), (b), and (c) of FIG. 2, parts (a), (b), and (C) of FIG. 8 are diagrams illustrating the display apparatus 1B in the unfolded state, in the process of being folded or unfolded, and in the overlapped state, respectively.

As illustrated in FIG. 8, the display apparatus 1B according to the third embodiment includes a detachable portion 8 for detachably connecting the casings 2 and 3. The detachable portion 8 is an element replacing the connecting portion 4 of the first and second embodiments.

The detachable portion 8 includes a first member 8A fixed to the casing 2 and a second member 8B fixed to the casing 3. The first member 8A and the second member 8B are fixed to one side of each of the rectangular casings 2 and 3, respectively. The first member 8A and the second member 8B are connectable to each other as illustrated in part (a) of FIG. 8, and the first member 8A and the second member 8B are detachable from each other as illustrated in part (b) of FIG. 8. In addition, the first member 8A and the second member 8B may be connected to each other also in a state in which the displays 5 and 6 are overlapped with each other as illustrated in part (c) of FIG. 8.

The casings 2 and 3 of the display apparatus 1B are detached as illustrated in part (b) of FIG. 8 from a connected (unfolded) state with the detachable portion 8 illustrated in part (a) of FIG. 8. As illustrated in part (c) of FIG. 8, the displays 5 and 6 are overlapped with each other when the casings 2 and 3 are overlapped with each other.

Although the display apparatus 1B according to the third embodiment is configured such that the two displays 5 and 6 are not rotatably connected, the displays 5 and 6 can be overlapped with each other with the detachable portion 8. As a result, the display apparatus 1B of the third embodiment provides the same effects described in the first embodiment.

Fourth Embodiment

Figure 9:
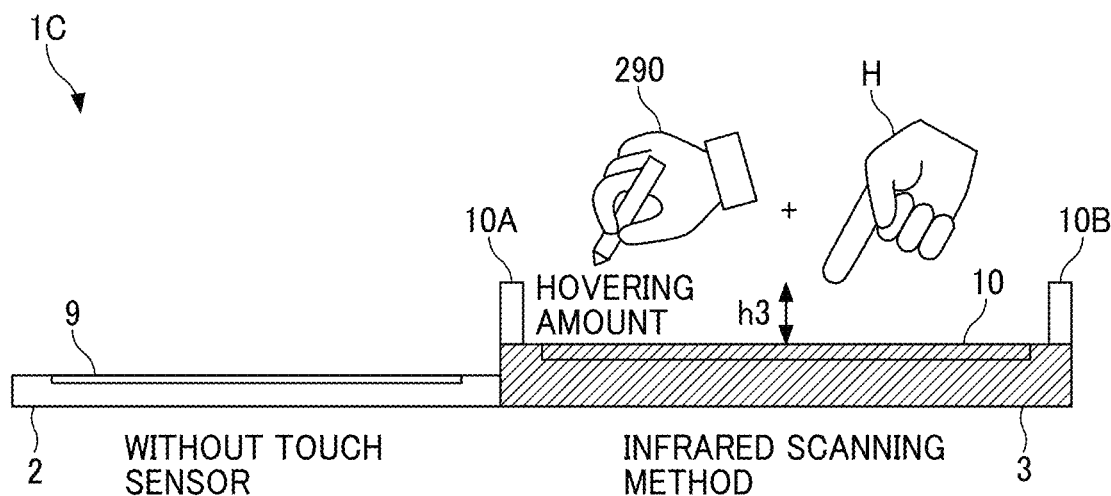
FIG. 9 is a diagram illustrating an example of a schematic configuration of the display apparatus according to a fourth embodiment of the present disclosure.
Figure 10:
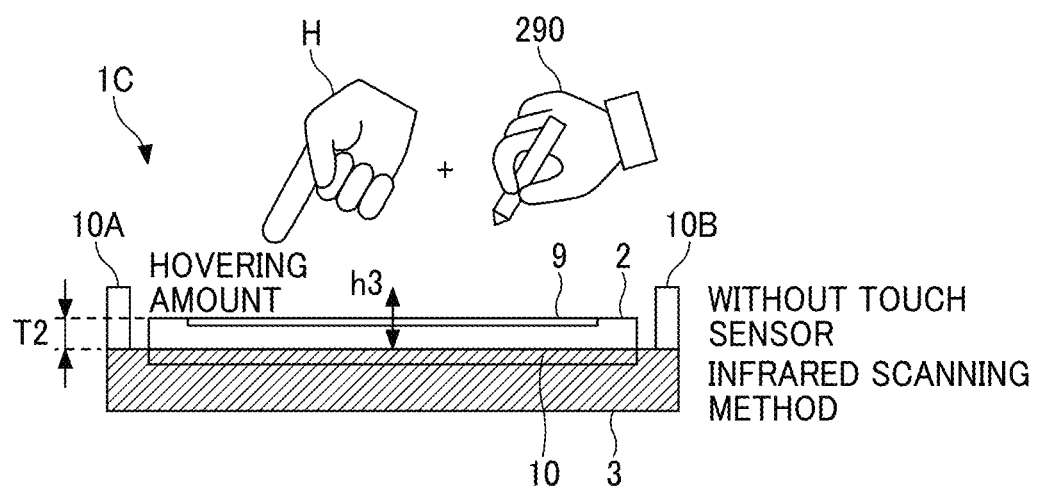
FIG. 10 is a schematic diagram illustrating the hovering amount of the display apparatus in the overlapped state according to the fourth embodiment of the present disclosure.

A fourth embodiment of the present disclosure is described with reference to FIGS. 9 and 10. FIG. 9 is a diagram illustrating an example of a schematic configuration of a display apparatus 1C according to the fourth embodiment. FIG. 10 is a schematic diagram illustrating the hovering amount of the display apparatus 1C in the overlapped state according to the fourth embodiment.

A display 9 mounted on the casing 2 of the display apparatus 1C according to the fourth embodiment includes no touch sensor. On the other hand, a display 10 mounted on the casing 3 includes an infrared touch sensor of an infrared scanning method. As illustrated in FIG. 9, the infrared touch sensor detects both the pen input and the finger input.

The display apparatus 1C of the fourth embodiment is configured such that the display 9 is overlapped on the display 10 when the casing 2 is overlapped on the casing 3. A hovering amount h3 of the infrared touch sensor is set larger than a thickness T2 of the casing 2 in the overlapping direction.

The infrared touch sensor is a sensor that irradiates infrared rays in parallel with the surface of the display 10 and detects interruption of the infrared rays to determine a touch point. For this reason, as illustrated in FIG. 9, the infrared touch sensor includes an infrared irradiation unit 10A and a light-receiving unit 10B at each of edge portions of the display 10, and the edge portions are usually positioned higher than the surface of the display 10. The heights of the infrared irradiation unit 10A and the light-receiving unit 10B are related to the hovering amount h3 of the infrared touch sensor. In general, the heights of the infrared irradiation unit 10A and the light-receiving unit 10B, that is, the heights of the edge portions of the display 10 on which the infrared touch sensor is included are equal to the hovering amount h3 of the infrared touch sensor.

Accordingly, as illustrated in FIG. 10, assuming that the display 10 on which the infrared touch sensor is included and the display 9 on which no touch sensor is included overlap with each other and the thickness of the display 9 is sufficiently smaller than the heights of the edge portions of the display 10, the infrared touch sensor detects a touch even when the display 9 on which no touch sensor is included is touched. This configuration enables the user to feel as if the display 9 had a function of a touch sensor.

Thus, according to a display apparatus including the two displays 9 and 10, such as the display apparatus 1C of the fourth embodiment, even in a configuration in which no touch sensor is included in the display 9 of the two displays 9 and 10, both touch sensors to receive the finger input and the pen input are used by using only the display 9 on the upper surface in a state in which the casings 2 and 3 are overlapped with each other. As a result, the display apparatus 1C of the fourth embodiment provides the same effects described in the first embodiment.

Note that the display apparatus 1C of the fourth embodiment preferably performs control so that the infrared touch sensor included in the display 10 does not recognize the display 9 as a foreign substance in a state in which the display 9 including no touch sensor is overlapped on the display 10. Thus, the detection accuracy of the infrared touch sensor is increased.

The embodiments of the present disclosure have been described above with reference to specific examples. However, the present disclosure is not limited to these specific examples. Those in which a person skilled in the art appropriately adds design modifications to these specific examples are also included in the scope of the present disclosure as long as the modified examples have the features of the present disclosure. The elements provided in each of the specific examples described above and the arrangement, conditions, shapes, and the like of the elements are not limited to those illustrated but can be changed as appropriate. The respective elements included in the above-described specific examples can be appropriately combined as long as there is no technical contradiction.

Although each single apparatus of the display apparatuses 1, 1A, 1B, and 1C includes two displays in the above embodiments, each single apparatus may include three or more displays in other embodiments.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A display apparatus comprising:
a first casing including a first screen including a first touch sensor to receive a finger input; and
a second casing including a second screen including a second touch sensor to receive a pen input,
wherein;
the first screen and the second screen overlap with each other, as the first casing and the second casing are overlapped with each other,
the second touch sensor includes an inductive touch sensor which uses electromagnetic induction, and
the inductive touch sensor has a hovering amount larger than a thickness of the first casing in an overlapping direction.

2. The display apparatus according to claim 1, wherein:
the first touch sensor is a capacitive touch sensor.

3. The display apparatus according to claim 1, wherein:
the first touch sensor is a pressure-sensitive touch sensor.

4. The display apparatus according to claim 1, further comprising:
a connecting portion connecting the first casing and the second casing in a foldable manner,
wherein the first screen and the second screen overlap with each other, as the first casing and the second casing are folded with the connecting portion.

5. The display apparatus according to claim 1, further comprising:
a detachable portion detachably connecting the first casing and the second casing,
wherein the first screen and the second screen overlap with each other, in a case where the first casing and the second casing detached from each other are overlapped with each other.

6. The display apparatus according to claim 1, further comprising:
a detachable portion detachably connecting the first casing and the second casing,
wherein the first screen and the second screen overlap with each other, in a case where the first casing and the second casing detached from each other are overlapped with each other.

7. A display apparatus, comprising:
a first casing including a first screen including a first touch sensor to receive a finger input;
a second casing including a second screen including a second touch sensor to receive a pen input; and
a connecting portion connecting the first casing and the second casing in a foldable manner,
wherein:
the first screen and the second screen overlap with each other, as the first casing and the second casing are overlapped with each other,
the first screen and the second screen overlap with each other, as the first casing and the second casing are folded with the connecting portion,
the first screen and the second screen are oriented in a same direction in a state where the first casing and the second casing are unfolded with the connecting portion; and
the first screen and the second screen are oriented in directions opposite to each other in a state where the first casing and the second casing are folded with the connecting portion, and
the display apparatus further comprises circuitry configured to:
set a detection direction of the second touch sensor in a display direction of the second screen in the state where the first casing and the second casing are folded with the connecting portion; and
switch the detection direction of the second touch sensor in the display direction of the first screen in the state where the first casing and the second casing are unfolded.

8. The display apparatus according to claim 7, wherein:
the second touch sensor includes an inductive touch sensor which uses electromagnetic induction, and the inductive touch sensor has a hovering amount larger than a thickness of the first casing in an overlapping direction.

9. The display apparatus according to claim 7, wherein: the first touch sensor is a capacitive touch sensor.

10. The display apparatus according to claim 7, wherein: the first touch sensor is a pressure-sensitive touch sensor.

\* \* \* \* \*